Dec. 4, 1951     M. J. ZALESKE     2,577,063
WRAP AROUND HOSE CLAMP
Filed Aug. 3, 1946
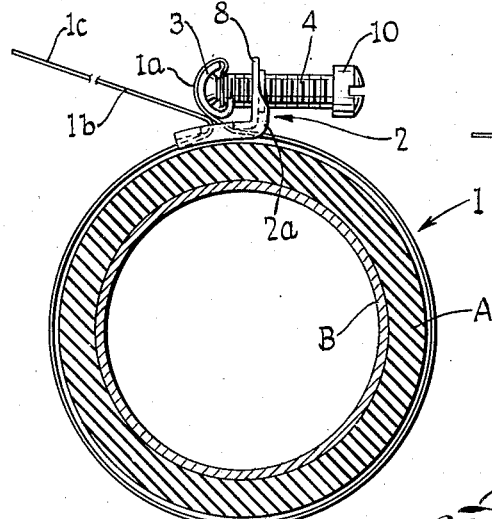
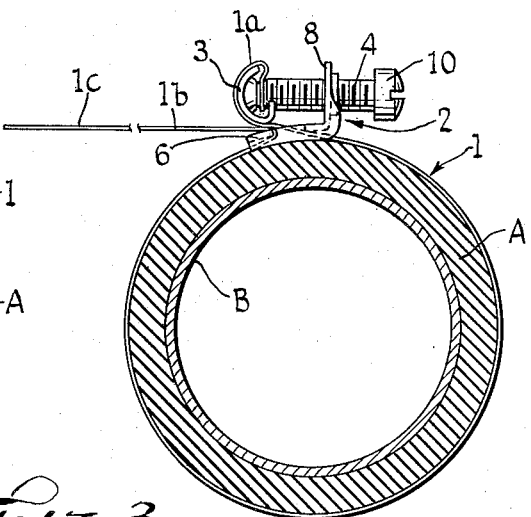
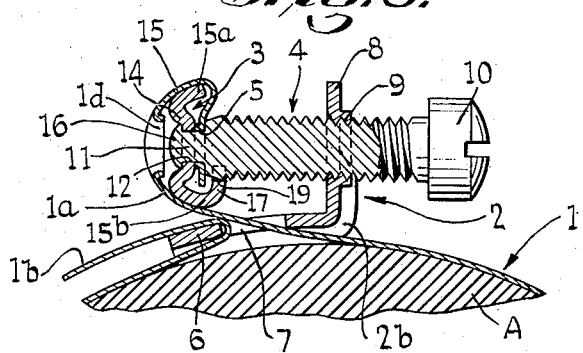
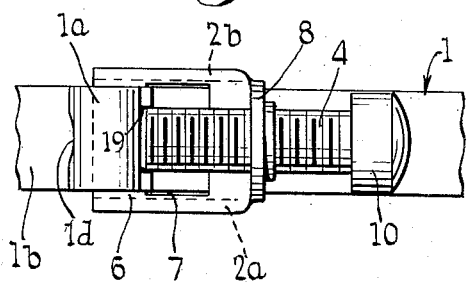
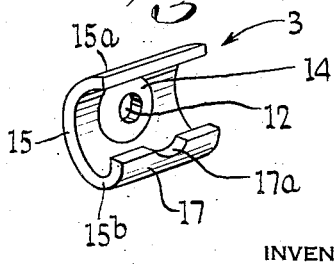
INVENTOR
MICHAEL J. ZALESKE
BY
ATTORNEYS

UNITED STATES PATENT OFFICE 2,577,063

WRAP-AROUND HOSE CLAMP

Michael J. Zaleske, Union, N. J., assignor to Ideal Clamp Manufacturing Co., Inc., New York, N. Y., a corporation of New York Application August 3, 1946, Serial No. 688,255

1 Claim. (Cl. 24—19)

This invention relates to hose clamps and more particularly to a new and improved "wrap around" type hose clamp.

The main object of the invention is to provide a hose clamp of the "wrap around" type that fits all common sizes of hose, that is simple and economical to make, and that is adapted to be tightened to an extraordinary degree of tension without danger of breaking under the strain.

The clamp comprises a single elongated band or strip of pliable material, such as sheet metal, that can be wrapped around a hose of any common size, together with a simple holding or tightening device that carries one end of the band and is adapted to receive its other or free end when the band has been wrapped around the hose. Then a screw of said device can be operated to thrust the carried end of the band against the free end, in a direction of pull substantially tangent to the hose, by such means that the free end is bent backward and confined upon a base of said device while the wrapped portion is constricted upon the hose, and while lateral strains resulting at the carried end of the band are counteracted so as to prevent bending or breaking of the tightening means of said device.

A manner of attaining the objects and advantages of this invention will become apparent from the following description of an exemplary embodiment and from the accompanying drawing in illustration thereof, while the improvements constituting my invention will be defined in the appended claim.

In the drawing,

Fig. 1 is a side elevation of the clamp assembled on a hose and in condition to be tightened, the hose appearing in cross-section;

Fig. 2 is a similar view, the clamp having been tightened;

Fig. 3 is an enlarged vertical section through the holding and tightening device;

Fig. 4 is a plan view of said device, and

Fig. 5 is a perspective view of the pusher element of said device.

The drawing shows a hose clamp composed of four main elements: a pliable clamp band 1, an angular saddle or frame 2, a peculiarly formed pusher 3, and a screw 4 which carries the pusher and one end of the band on its end.

The band 1 is simply an elongated strip of strong pliable material, such as low carbon sheet steel of about .016" thickness, suitable for hose clamp use. One end portion, by which it is fixed and carried as hereinafter described, is formed with a reinforced hole 5 (see Fig. 3). The band is made long enough to extend from this fixed end portion 1a entirely around any common size of hose, such as hose A to be clamped upon nipple B, and still to leave a free end 1b from which any unwanted excess, such as 1c, may simply be cut off and discarded. The holding and tightening of the band upon the hose are achieved by the device composed of saddle 2, pusher 3 and screw 4.

The angular saddle or frame 2 has a base 6 formed with an opening 7 through which to extend two portions of the band 1, as hereinafter described. It also has an upright arm 8 formed with a threaded aperture 9 in which the screw 4 is threaded so as to be extended over the base 6. Lateral flanges 2a and 2b extend along this base to rest upon the hose and afford space for the band. These flanges also strengthen the angle between the base 6 and the arm 8 when they are extended around this angle as shown. The base 6 is adapted to lie at the surface of the hose in a position transverse to the hose axis, for which purpose it preferably has an arcuate shape as shown. In that position the path of the end of the screw 4 is spaced somewhat above but substantially parallel to a line tangent to the curvature of the hose.

The screw 4 is formed with a driving head 10 and with a stud 11 at its operating end. This stud is extended first through the hole 5 in the band end and then through a hole 12 in the central portion of the pusher 3, so that the band end 1a is held secure and so that it and the pusher may be thrust forward as a unit when the screw is so turned in bore 9 as to be extended farther over the base 6. The central portion of the pusher bordering hole 12 preferably has a depression 14 from the pusher face 15, and a retaining head 16 is formed on the end of the screw stud 11 within this depression. If desired, the band end portion 1a may be provided with a second flanged opening 1d to permit access to the screw stud for forming the retaining head 16.

The pusher preferably is shaped out of relatively heavy sheet metal, and so as to provide its face 15 in a convexly curved form having upper and lower marginal portions 15a and 15b, respectively. As appears from Figs. 1, 2 and 3, the fixed end portion 1a of the band extends upward from the hole 5, where it receives the screw stud 11, to the upper margin 15a of the pusher and thence down over the curved face 15, and from the lower margin 15b of the pusher the band passes through the opening 7 in base 6.

The pusher 3 is formed also with an integral portion 17 above its lower margin which is arranged to bear against the under side of the screw 4 at a location spaced from the stud 11 toward the driving end 10. This portion 17 preferably is an upwardly extending flange integral with the body of the pusher 3, and it preferably has an arcuate groove 17a (Fig. 5) in its margin which forms a seat or bearing for the adjacent surface 19 of the screw.

Previous to its use, the clamp may have the operating end of the screw 4 and the assembly thereon retracted toward arm 8, with the band 1 extending through opening 7 in a straight or flat condition.

To apply the clamp to a hose, such as hose A, the saddle is simply held by one hand with its base at the surface of the hose, and the band is wrapped around the hose by the other hand and brought upwardly through the opening 7. Upon pulling the free end 1b taut by hand and then bending it backward somewhat over the underlying part of base 6, the clamp acquires an applied but untightened condition, substantially as shown in Fig. 1. It then is secured and tightened simply by operating the screw 4 so as to thrust the assembly at the screw end farther over the said part of base 6.

In the course of that tightening movement the part of band end 1a overlying the lower margin 15b of the pusher face first engages the free band end 1b just above its backward bend at the margin of opening 7, and the continued movement clamps the free band end backward over the said part of base 6, substantially as appears in Figs. 2 and 3. This continued movement also thrusts end 1a forward so that there is a substantially tangential pull upon and a contraction of that portion of the band encircling the hose. So the hose becomes constricted or clamped tightly upon the nipple B, with a substantially uniform force around its circumference.

Meanwhile, a lateral or bending stress arises upon the pusher 3 and its connection with the screw stud 11, which increases as the strain on the band and the clamping force increase, for that strain exerts a force component urging the lower margin 15b of the pusher radially upward toward the screw 4. This force component or stress, however, is absorbed or counteracted by the bearing of extension 17 at 17a against the under side of the screw at 19. The clamp thus can be tightened to an extraordinarily great tension or clamping force without danger of bending or breaking either the pusher 3 or the fixed end of the band at 5 away from its respective support at the end of the screw.

It will be understood that various modifications of the embodiment above described and illustrated in the drawing may be resorted to without departing from the novel features of my invention, which are intended to be defined in the appended claim.

I claim:

A hose clamp comprising a flexible band having a free severable leg and another leg and of a length greater than the circumference of hose to be clamped, a rigid one-piece angular frame having a base and an upright arm, said base being formed with an opening freely receiving said other leg of said band and adapted to receive its free leg when the band is positioned to clamp a hose, said arm having a threaded bore and carrying a screw threaded through said bore to extend over said base, the screw having an integral axial stud of reduced diameter on its end, a rigid one-piece angular pusher held on the screw within the angle of said frame and having an upright portion and a base portion bent backward therefrom toward the arm of said frame, said base portion extending backward beneath and beyond said stud and bearing against the under side of the screw thread, the other leg of said band extending through said opening and under the pusher base portion and thence over the face of said upright portion and to an end portion bent back over the inside thereof, said band end portion and said pusher upright portion having registering central openings therein, said stud extending rotatably through said openings and holding the pusher and said other leg on the end of said screw with the pusher base portion underlying the thread of the screw, the pusher base portion acting through said other leg to clamp the free leg of the band against the frame base when the screw is advanced thereover to clamp the positioned band on a hose, and the pusher base portion at the same time bearing against the screw thread to help sustain the clamping tension.

MICHAEL J. ZALESKE.

REFERENCES CITED

The following references are of record in the file of this patent:

UNITED STATES PATENTS

| Number | Name | Date |
|---|---|---|
| 912,097 | Erickson | Feb. 9, 1909 |
| 1,070,952 | Erickson | Aug. 19, 1913 |
| 1,111,479 | Malleville | Sept. 22, 1914 |
| 1,412,188 | Lopdell | Apr. 11, 1922 |
| 1,778,504 | Malleville | Oct. 14, 1930 |
| 1,956,107 | Suchter | Apr. 24, 1934 |
| 2,073,294 | Caillau | Mar. 9, 1937 |
| 2,218,481 | Prochaska | Oct. 15, 1940 |
| 2,339,138 | Black | Jan. 11, 1944 |

FOREIGN PATENTS

| Number | Country | Date |
|---|---|---|
| 317,648 | Germany | Dec. 22, 1919 |
| 453,957 | Great Britain | Sept. 22, 1936 |
| 650,392 | France | Sept. 18, 1928 |